United States Patent
Wang et al.

(10) Patent No.: US 10,671,135 B2
(45) Date of Patent: Jun. 2, 2020

(54) INTELLIGENT MOBILE POWER SUPPLY AND METHOD FOR USB DATA COMMUNICATION THEREWITH

(71) Applicant: Norel Systems Limited, Tianjin (CN)

(72) Inventors: Yuanlong Wang, Tianjin (CN); Ting Wu, Tianjin (CN); Wei Zhao, Tianjin (CN); Miao Chen, Tianjin (CN)

(73) Assignee: NOREL SYSTEMS LIMITED, Tianjin (CN)

( * ) Notice: Subject to any disclaimer, the term of this patent is extended or adjusted under 35 U.S.C. 154(b) by 201 days.

(21) Appl. No.: 16/053,104

(22) Filed: Aug. 2, 2018

(65) Prior Publication Data
US 2019/0050037 A1    Feb. 14, 2019

(30) Foreign Application Priority Data
Aug. 11, 2017  (CN) ............................ 2017 1 0685541

(51) Int. Cl.
*G06F 1/26* (2006.01)
*H02J 7/00* (2006.01)
*G06F 13/42* (2006.01)

(52) U.S. Cl.
CPC .............. *G06F 1/266* (2013.01); *G06F 1/263* (2013.01); *G06F 13/4282* (2013.01); *H02J 7/0068* (2013.01); *G06F 2213/0042* (2013.01); *H02J 7/00* (2013.01); *H02J 7/00034* (2020.01)

(58) Field of Classification Search
CPC ...................................................... G06F 1/266
USPC ........................................ 320/127, 128, 135
See application file for complete search history.

(56) References Cited

U.S. PATENT DOCUMENTS

| 10,574,073 | B2* | 2/2020 | Han | ........................... H02J 1/10 |
| 2016/0094071 | A1* | 3/2016 | Nge | ..................... G06F 13/4022 320/107 |

* cited by examiner

*Primary Examiner* — Edward Tso
*Assistant Examiner* — Ahmed H Omar
(74) *Attorney, Agent, or Firm* — Locke Lord LLP; Tim Tingkang Xia, Esq.

(57) ABSTRACT

An intelligent mobile power supply and a method for USB data communication therewith. The intelligent mobile power supply includes a battery, a charging control module, a discharging control module, a first USB interface and a second USB interface. In the single charging mode, a charged device receives a discharge of the intelligent mobile power supply through the discharging control module, but the intelligent mobile power supply does not perform USB data communication with the charged device. While in the charging and communication mode, the charged device receives the discharge of the intelligent mobile power supply through the discharging control module and can perform USB data communication with the intelligent mobile power supply through the first USB interface simultaneously. The second USB interface is connected with the charging control module, and the second USB interface can be connected with a power adapter or a PC host to charge the battery.

25 Claims, 1 Drawing Sheet

INTELLIGENT MOBILE POWER SUPPLY AND METHOD FOR USB DATA COMMUNICATION THEREWITH

CROSS-REFERENCE TO RELATED PATENT APPLICATION

This application claims priority to and the benefit of, pursuant to 35 U.S.C. § 119(a), patent application Serial No. CN 201710685541.6 filed in China on Aug. 11, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The invention relates to the technical field of electronic accessories and mobile power supplies, in particular to an intelligent mobile power supply and a method for USB data communication with the intelligent mobile power supply.

BACKGROUND

A mobile power supply, also known as a power bank, is a portable charger that integrates power supply and charging functions. It can supply power or stand-by charging to a variety of digital products such as mobile phones, tablet computers, notebook computers, digital cameras, handheld game consoles, and portable sound boxes anytime and anywhere. The mobile power supply generally uses lithium batteries as a storage medium. Due to the advantages of small size, large capacity, and moderate price, lithium batteries have been widely used. The housing of the mobile power supply usually includes a charging interface and a discharging interface. The most common type of interface is Universal Serial Bus (USB), which is an external bus standard originally used to regulate the connection and communication between computers and external devices, and has been widely used in various mobile portable devices ever since.

With the increase of the battery capacity of mobile devices, the battery life has been greatly improved, but the increase of the battery capacity also means that it takes longer to charge. Charging with a maximum power of 5 V and 500 mA using a standard USB 2.0 interface takes several hours for a 3000 mA battery to fill up, which give the users a really bad experience. Therefore, various USB interface-based fast charging technologies have emerged. These fast charging protocols mainly include USB Battery Charging protocol, Qualcomm Quick Charging Protocol, Huawei Fast Charger Protocol, Samsung Adaptive Fast Charging Protocol, Mediatek Pump Express Charging Protocol and Apple Fast Charging Protocol. These fast charging standards use high-current or high-voltage charging methods which can charge the battery of the mobile phone in a short period of time, or allow the mobile phone to run for several hours by charging for five minutes in case of emergency, thus getting rid of the extra-long waiting time for charging.

In the prior art, the function of the mobile power supply is single and is usually limited to supplying power to the mobile devices, while common mobile devices (such as mobile phones and tablet computers) often need to expand external storage. If the storage medium can be integrated in the mobile power supply, and the USB interface can be used for charging and data communication simultaneously, that is, when charging a mobile device, the storage medium in the mobile power supply can be accessed through the mobile device (such as an APP installed thereon), the function of the mobile power supply can be expanded and the user experience can be enhanced.

Furthermore, both the discharging interface of common mobile power supplies and the charging interface of mobile devices represented by the Android mobile phone are USB interfaces. When charging an Android mobile device from the mobile power supply using a USB charging line, the Android mobile device first detects the maximum discharging power of the mobile power supply according to the fast charging protocol, and then selects the maximum charging power to charge itself according to its own power receiving capacity. The fast charging protocol generally stipulates that fast charging can only be performed when the discharging interface of the mobile power supply is in a single charging mode. When the discharging interface of the mobile power supply is in a charging and communication mode, that is, when USB data communication is allowed while charging, charging can only be performed in a mode of 5 V and 500 mA at maximum. That is, when USB data communication is allowed, the mobile device can only be charged with a maximum power of 2.5 W. The above-mentioned fast charging refers to charging the mobile device with a power exceeding 2.5 W.

If the mobile device can switch between the single charging mode and the charging and communication mode to ensure that the mobile device can perform data communication with the mobile power supply and can also rapidly charge the mobile device when there is no data communication, the function of the mobile power supply can be expanded while enhancing the user experience.

SUMMARY

The technical problem to be solved by the invention is to provide an intelligent mobile power supply and a method, which allow switching between a single charging mode and a charging and communication mode to ensure that the mobile device can perform data communication with the mobile power supply and can also rapidly charge the mobile device when there is no data communication, by fully utilizing a USB interface capable of supplying power and performing data communication simultaneously.

In order to solve the above technical problem, the present invention adopts the following technical scheme:

The invention provides an intelligent mobile power supply capable of USB data communication, comprising a battery, a charging control module, a discharging control module, a first USB interface and a second USB interface, and further comprising a micro-control unit, a discharging mode selection module, and a discharging mode selection signal, the first USB interface is connected with a USB interface of a charged device through a first USB cable, a VBUS signal of the first USB interface is connected with the discharging control module which is connected with the battery, DP and DM signals, or CC1 and CC2 signals, or DP and DM as well as CC1 and CC2 signals of the first USB interface are connected with the discharging mode selection module, the discharging mode selection module is connected with the discharging mode selection signal, selectively configures the first USB interface into a single charging mode or a charging and communication mode according to the discharging mode selection signal, and completes the mode configuration according to a fast charging protocol, in the single charging mode, the charged device receives discharge of the intelligent mobile power supply through a VBUS, but the intelligent mobile power supply does not perform USB data communication with the charged device, in the charging and communication mode, the charged device receives the discharge of the intelligent mobile power supply through the VBUS and can perform USB data communication with the intelligent mobile power supply simultaneously, the micro-control unit comprises a first USB controller, wherein the DP and DM signals of the first USB interface are connected with the first USB controller; the first USB controller works in a USB Host mode and performs USB data communication with the charged device in the charging and communication mode; and the second USB interface is connected with the charging control module which is connected with the battery, and the second USB interface may be connected with a power adapter or a PC host to charge the battery through a second USB cable.

Preferably, the intelligent mobile power supply further comprises a storage device, and the micro-control unit further comprises a storage controller, wherein the storage controller is connected with the storage device; in the charging and communication mode, the micro-control unit performs USB data communication with the charged device through the first USB controller, and at the same time, the micro-control unit performs read and write operations on the storage device through the storage controller.

Preferably, the storage device is a flash memory card, a flash memory chip or a hard disk.

Preferably, the intelligent mobile power supply further comprises a wireless transmitting and receiving apparatus, the micro-control unit is connected with the wireless transmitting and receiving apparatus, and in the charging and communication mode, the micro-control unit performs USB data communication with the charged device through the first USB controller, and transmits and receives data through the wireless transmitting and receiving apparatus.

Preferably, the charging control module is also connected with the micro-control unit, which obtains battery power and status information through the charging control module.

Preferably, the discharging mode selection signal is generated by a switch or button included in an intelligent mobile power supply, or by the micro-control unit.

Preferably, the fast charging protocol is USB Battery Charging Protocol, Qualcomm Quick Charging protocol, Huawei Fast Charger Protocol, Samsung Adaptive Fast Charging Protocol, Mediatek Pump Express Charging Protocol, Apple Fast Charging Protocol or USB Power Delivery Charging Protocol.

Preferably, the charging and communication mode is Standard Download Port (SDP) defined by the USB Battery Charging Protocol.

Preferably, the charging and communication mode is Charging Download Port (CDP) defined by the USB Battery Charging Protocol.

Preferably, the single charging mode is a mode defined by a fast charging protocol other than the Standard Download Port (SDP) and the Charging Download Port (CDP) defined by the USB Battery Charging Protocol.

Preferably, the micro-control unit further comprises a second USB controller, the second USB interface is connected with the second USB controller of the micro-control unit, the second USB controller works in a USB Device mode, and when the second USB interface is connected with the PC host through the second USB cable, the micro-control unit may selectively perform USB data communication with the PC host through the second USB controller or perform USB data communication with the charged device through the first USB controller in a charging and communication mode.

Preferably, the charged device is a mobile device running an Android system.

The invention provides a method for USB data communication with an intelligent mobile power supply. The intelligent mobile power supply comprises a first USB interface and a second USB interface, wherein the first USB interface is connected with a USB interface of a charged device through a first USB cable, the second USB interface may be connected with a power adapter or a PC host through a second USB cable to charge the intelligent mobile power supply, the charged device runs an Android operating system, and the intelligent mobile power supply further comprises a first USB controller, the intelligent mobile power supply selectively configures the first USB interface into a single charging mode or a charging and communication mode, and completes the mode configuration according to a fast charging protocol, in the single charging mode, the charged device receives discharge of the intelligent mobile power supply through a VBUS, but the intelligent mobile power supply does not perform USB data communication with the charged device, in the charging and communication mode, the charged device receives the discharge of the intelligent mobile power supply through the VBUS and can perform USB data communication with the intelligent mobile power supply simultaneously, the first USB controller is connected with the first USB interface and performs USB data communication with the charged device in the charging and communication mode, when the first USB interface is not connected with the charged device, the intelligent mobile power supply sets the first USB interface to the single charging mode, when the USB interface of the charged device is connected to the first USB interface through the first USB cable, the first USB interface remains in the single charging mode, in the single charging mode, a user can artificially force the intelligent mobile power supply to change the configuration of the first USB interface to the charging and communication mode, and after the charged device detects that the first USB interface has changed to the charging and communication mode, the charged device starts the USB data connection with the intelligent mobile power supply and performs USB data communication while being charged, and in the charging and communication mode, the first USB controller works in the USB Host mode and the charged device works in the USB Device mode.

Preferably, after the USB data connection between the charged device and the intelligent mobile power supply is established, the first USB controller notifies the charged device to start the designated APP through the USB data connection and performs subsequent USB data communication with the charged device.

Preferably, the intelligent mobile power supply further comprises a storage device, and the APP performs USB data interaction with the intelligent mobile power supply in the charging and communication mode to read from and write to the storage device.

Preferably, the storage device is a flash memory card, a flash memory chip, or a hard disk.

Preferably, when the APP stops reading from and writing to the storage device on the intelligent mobile power supply in the charging and communication mode and a preset time is exceeded, the intelligent mobile power supply switches the first USB interface to the single charging mode.

Preferably, the intelligent mobile power supply can transmit battery power and status information to the APP through USB data communication in the charging and communication mode.

Preferably, the intelligent mobile power supply further comprises a wireless transmitting and receiving apparatus, and the APP performs USB data interaction with the intelligent mobile power supply in the charging and communication mode and transmits and receives data through the wireless transmitting and receiving apparatus.

Preferably, when the APP stops transmitting and receiving data through the wireless transmitting and receiving apparatus on the intelligent mobile power supply in the charging and communication mode and a preset time is exceeded, the intelligent mobile power supply switches the first USB interface to the single charging mode.

Preferably, when the APP is closed in the charging and communication mode, a notification will be sent to the intelligent mobile power supply through USB data communication, and the intelligent mobile power supply will switch the first USB interface to the single charging mode after receiving the notification.

Preferably, when the APP attempts USB data communication with the intelligent mobile power supply, but the first USB interface of the intelligent mobile power supply is in the single charging mode, the APP will inform the user that the user can artificially force the intelligent mobile power supply to change the configuration of the first USB interface to the charging and communication mode.

Preferably, the method for artificially forcing the intelligent mobile power supply to change the configuration of the first USB interface to the charging and communication mode is to artificially toggle or press a switch or button included in the intelligent mobile power supply, and the intelligent mobile power supply changes the configuration of the first USB interface to the charging and communication mode after detecting this operation.

Preferably, the fast charging protocol is USB Battery Charging protocol, Qualcomm Quick Charging protocol, Huawei Fast Charger protocol, Samsung Adaptive Fast Charging Protocol, Mediatek Pump Express Charging Protocol, Apple Fast Charging Protocol or USB Power Delivery Charging Protocol.

Preferably, the charging and communication mode is Standard Download Port (SDP) defined by the USB Battery Charging protocol.

Preferably, the charging and communication mode is Charging Download Port (CDP) defined by the USB Battery Charging Protocol.

Preferably, the single charging mode is a mode defined by a fast charging protocol other than the Standard Download Port (SDP) and the Charging Download Port (CDP) defined by the USB Battery Charging Protocol.

Preferably, the intelligent mobile power supply further comprises a second USB controller. The second USB interface is connected with the second USB controller, and the second USB controller works in a USB Device mode. When the second USB interface is connected with the PC host through the second USB cable, the intelligent mobile power supply may selectively perform USB data communication with the PC host through the second USB controller or perform USB data communication with the charged device through the first USB controller in the charging and communication mode.

The invention provides another method for performing USB data communication with an intelligent mobile power supply. The intelligent mobile power supply comprises a first USB interface, wherein the first USB interface is connected with a USB interface of a charged device through a first USB cable, and the intelligent mobile power supply further comprises a first USB controller, the intelligent mobile power supply selectively configures the first USB interface into a single charging mode or a charging and communication mode, and completes the mode configuration according to a fast charging protocol, in the single charging mode, the charged device receives discharge of the intelligent mobile power supply through a VBUS, but the intelligent mobile power supply does not perform USB data communication with the charged device, in the charging and communication mode, the charged device receives the discharge of the intelligent mobile power supply through the VBUS and can perform USB data communication with the intelligent mobile power supply simultaneously, the first USB controller is connected with the first USB interface and performs USB data communication with the charged device in the charging and communication mode, when the first USB interface is not connected with the charged device, the intelligent mobile power supply sets the first USB interface to the single charging mode, when the USB interface of the charged device is connected to the first USB interface through the first USB cable, the first USB interface remains in the single charging mode, in the single charging mode, a user can artificially force the intelligent mobile power supply to change the configuration of the first USB interface to the charging and communication mode, and after the charged device detects that the first USB interface changes to the charging and communication mode, the charged device starts the USB data connection with the intelligent mobile power supply and performs USB data communication while being charged, and in the charging and communication mode, the first USB controller works in the USB Host mode and the charged device works in the USB Device mode.

Preferably, after the USB data connection between the charged device and the intelligent mobile power supply is established, the first USB controller notifies the charged device to start the designated APP through the USB data connection and performs subsequent USB data communication with the charged device.

Preferably, the intelligent mobile power supply further comprises a storage device, and the APP performs USB data interaction with the intelligent mobile power supply in the charging and communication mode to read from and write to the storage device.

Preferably, the storage device is a flash memory card, a flash memory chip, or a hard disk.

Preferably, when the APP stops reading from and writing to the storage device on the intelligent mobile power supply in the charging and communication mode and a preset time is exceeded, the intelligent mobile power supply switches the first USB interface to the single charging mode.

Preferably, the intelligent mobile power supply can transmit battery power and status information to the APP through USB data communication in the charging and communication mode.

Preferably, the intelligent mobile power supply further comprises a wireless transmitting and receiving apparatus, and the APP performs USB data interaction with the intelligent mobile power supply in the charging and communication mode and transmits and receives data through the wireless transmitting and receiving apparatus.

Preferably, when the APP stops transmitting and receiving data through the wireless transmitting and receiving apparatus on the intelligent mobile power supply in the charging and communication mode and a preset time is exceeded, the intelligent mobile power supply switches the first USB interface to the single charging mode.

Preferably, when the APP is closed in the charging and communication mode, a notification will be sent to the intelligent mobile power supply through USB data communication, and the intelligent mobile power supply will switch the first USB interface to the single charging mode after receiving the notification.

Preferably, when the APP attempts USB data communication with the intelligent mobile power supply, but the first USB interface of the intelligent mobile power supply is in the single charging mode, the APP will inform the user that the user can artificially force the intelligent mobile power supply to change the configuration of the first USB interface to the charging and communication mode.

Preferably, the method for artificially forcing the intelligent mobile power supply to change the configuration of the first USB interface to the charging and communication mode is to artificially toggle or press a switch or button included in the intelligent mobile power supply, and the intelligent mobile power supply changes the configuration of the first USB interface to the charging and communication mode after detecting this operation.

Preferably, the fast charging protocol is USB Battery Charging protocol, Qualcomm Quick Charging protocol, Huawei Fast Charger protocol, Samsung Adaptive Fast Charging Protocol, Mediatek Pump Express Charging Protocol, Apple Fast Charging Protocol or USB Power Delivery Charging Protocol.

Preferably, the charging and communication mode is Standard Download Port (SDP) defined by the USB Battery Charging protocol.

Preferably, the charging and communication mode is Charging Download Port (CDP) defined by the USB Battery Charging Protocol.

Preferably, the single charging mode is a mode defined by a fast charging protocol other than the Standard Download Port (SDP) and the Charging Download Port (CDP) defined by the USB Battery Charging Protocol.

Preferably, the charged device is a mobile device running an Android system.

Preferably, the intelligent mobile power supply further comprises a second USB interface which may be connected with a power adapter or a PC host through a second USB cable to charge the intelligent mobile power supply.

Preferably, the intelligent mobile power supply further comprises a second USB controller. The second USB interface is connected with the second USB controller, and the second USB controller works in a USB Device mode. When the second USB interface is connected with the PC host through the second USB cable, the intelligent mobile power supply may selectively perform USB data communication with the PC host through the second USB controller or perform USB data communication with the charged device through the first USB controller in the charging and communication mode.

The invention has the beneficial effects that, by fully utilizing the USB interface capable of supplying power and performing data communication simultaneously, the intelligent mobile power supply and the method for USB data communication with the intelligent mobile power supply are provided, which allow switching between the single charging mode and the charging and communication mode to ensure that the mobile device can perform data communication with the mobile power supply and can also rapidly charge the mobile device when there is no data communication.

BRIEF DESCRIPTION OF THE DRAWINGS

The present invention will be further explained below with reference to the accompanying drawings and examples.

In which:

| | |
|---|---|
| 1 intelligent mobile power supply | 7 storage device |
| 9 wireless transmitting and receiving apparatus | 5 micro-control unit |
| 11 first USB interface | 12 second USB interface |
| 31 first USB cable | 32 second USB cable |
| 21 charged device | 22 PC host |
| 23 power adapter | 17 discharging mode selection signal |
| 13 discharging control module | 15 discharging mode selection module |
| 14 charge control module | 16 battery |
| 51 first USB controller | 52 second USB controller |
| 53 storage controller | 18 switch or button |

DETAILED DESCRIPTION

A further description of an intelligent mobile power supply and a method for USB data communication therewith according to the present invention will be made below with reference to the embodiments shown in the accompanying drawings.

Figure 1:
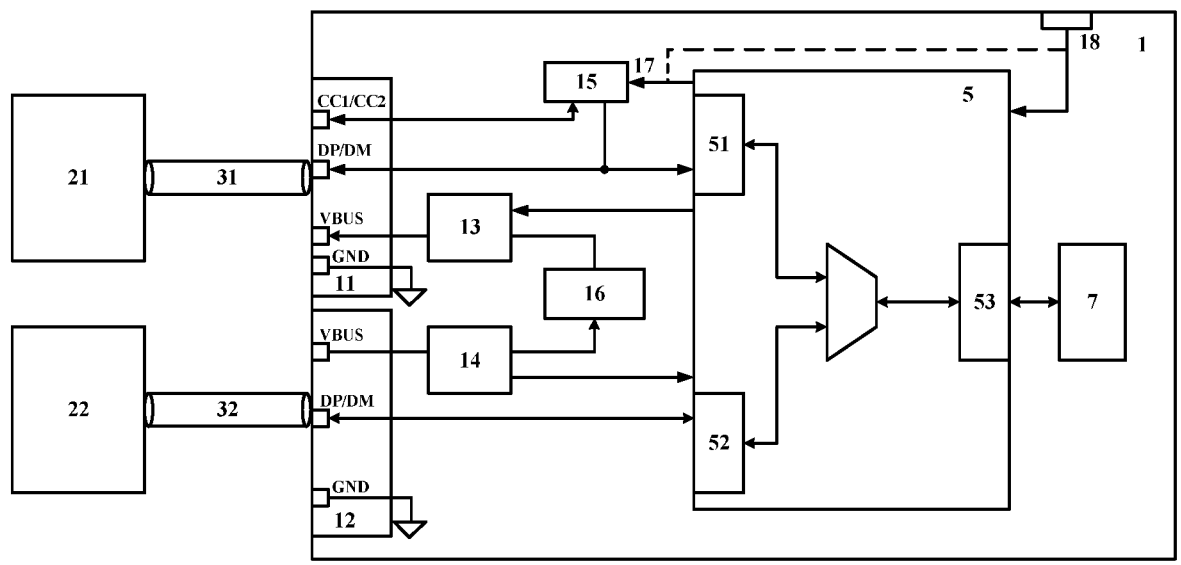
FIG. 1 is a block view and schematic illustration of application of a first embodiment of an intelligent mobile power supply capable of USB data communication according to the present invention.

FIG. 1 shows a first embodiment of an intelligent mobile power supply capable of USB data communication according to the present invention. In this embodiment, the intelligent mobile power supply 1 includes a battery 16, a charging control module 14, a discharging control module 13, a first USB interface 11, and a second USB interface 12. The intelligent mobile power supply 1 further includes a micro-control unit 5, a discharging mode selection module 15, and a discharging mode selection signal 17. The intelligent mobile power supply 1 may further include a switch or button 18.

The first USB interface 11 is connected with a USB interface of the charged device 21 through a first USB cable 31.

VBUS signals of the first USB interface 11 are connected to the discharging control module 13 which is connected with the battery.

The first USB interface 11 may be a USB type A receptacle or a USB type C receptacle. When the first USB interface 11 is a USB type A receptacle, DP and DM signals of the first USB interface 11 are connected with the discharging mode selection module 15. When the first USB interface 11 is a USB type C receptacle, it further includes CC1 and CC2 signals, and its DP and DM signals, or CC1 and CC2 signals, or DP and DM signals as well as CC1 and CC2 signals are connected to the discharging mode selection module 15.

The discharging mode selection module 15 is connected with the discharging mode selection signal 17. The discharging mode selection module 15 selectively configures the first USB interface 11 into a single charging mode or a charging and communication mode according to the discharging mode selection signal 17. The discharging mode selection module 15 completes the configuration of the mode according to a fast charging protocol.

In the single charging mode, the charged device 21 receives the discharge of the intelligent mobile power supply 1 through a VBUS, but the intelligent mobile power supply 1 does not perform USB data communication with the charged device 21.

In the charging and communication mode, the charged device 21 receives the discharge of the intelligent mobile power supply 1 through the VBUS, and can perform USB data communication with the intelligent mobile power supply 1 through DP and DM simultaneously.

The micro-control unit 5 comprises a first USB controller 51. The DP and DM signals of the first USB interface 11 are connected with the first USB controller 51. The first USB controller 51 operates in a USB Host mode and performs USB data communication with the charged device 21 in the charging and communication mode. The charged device 21 operates in a USB Device mode.

The second USB interface 12 is connected with the charging control module 14, which is connected with the battery 16. The second USB interface 12 may be connected with a PC host 22 through a second USB cable 32 to charge the battery 16.

The second USB interface 12 may also be replaced by a power socket.

The intelligent mobile power supply 1 further includes a storage device 7. The micro-control unit 5 further includes a storage controller 53 connected with the storage device 7. In the charging and communication mode, the micro-control unit 5 performs USB data communication with the charged device 21 through the first USB controller 51 and performs read and write operations on the storage device 7 through the storage controller 53 simultaneously. The storage device 7 may be a flash memory card, a flash memory chip or a hard disk.

The discharging mode selection signal 17 is generated by the switch or button 18 included in the intelligent mobile power supply or by the micro-control unit 5. When the discharging mode selection signal 17 is generated by the switch or button 18, the dotted line between the switch or button 18 and the discharging mode selection signal 17 in FIG. 1 is valid, indicating that the switch or button 18 generates the discharging mode selection signal 17. When the discharging mode selection signal 17 is generated by the micro-control unit 5, the dotted line between the switch or button 18 and the discharging mode selection signal 17 is invalid. At this time, the switch or button 18 is an input signal of the micro-control unit 5, and the micro-control unit 5 generates the discharging mode selection signal 17 according to the state of the switch or button 18, or according to USB data communication with the charged device 21, or according to the internal state of the micro-control unit 5.

In this embodiment, the micro control unit 5 generates a control signal to the discharging control module 13 for controlling whether the discharging control module 13 is disconnected or connected with a VBUS power supply of the first USB interface 11.

In this embodiment, the charging control module 14 generates a control signal to the micro-control unit 5 for the micro-control unit 5 to acquire the power and status information of the battery 16 through the charging control module 14.

In this embodiment, the fast charging protocol may be USB Battery Charging protocol, Qualcomm Quick Charging protocol, Huawei Fast Charger protocol, Samsung Adaptive Fast Charging Protocol, Mediatek Pump Express Charging Protocol, Apple Fast Charging Protocol or USB Power Delivery Charging Protocol.

The USB Battery Charging Protocol (hereinafter referred to as USB BC Protocol) specifies the criteria to be followed for charging the batteries of portable devices using the USB interface. In fact, the core of the USB BC Protocol is to introduce a charging port identification mechanism through which a portable USB device conforming to the USB BC Protocol can identify whether it is plugged into a standard USB Downstream Port (hereinafter referred to as SDP), a USB Dedicated Charger (hereinafter referred to as DCP), or a USB Downstream Port (hereinafter referred to as CDP) optimized for charging. Then the charged device will acquire different charging currents according to the type of the charging port and according to the requirements of USB BC Protocol, and perform data communication with certain specific interface types if allowed.

According to the USB BC Protocol, when the USB interface is configured as SDP, its DP and DM signals are respectively connected with a nominal 15K pull-down resistor to ground. When the USB interface is configured as DCP, its DP and DM signals have no pull-down resistor to ground, but there is a resistance less than 200 ohms between DP and DM. The charged device identifies the SDP or DCP mode by detecting these two different states.

The discharging mode selection module 15 may use the SDP defined by the USB BC Protocol as the charging and communication mode and the DCP defined by the USB BC Protocol as the single charging mode. When the first USB interface 11 is configured as SDP, according to the USB BC Protocol, the discharging mode selection module 15 connects the DP and DM signals to the nominal 15K pull-down resistor to ground, respectively. The VBUS supply voltage of the first USB interface 11 is 5 V. After detecting the SDP mode, the charging device 21 takes power from the VBUS of the first USB interface 11 at a maximum of 500 mA. Meanwhile, the charged device 21 may also perform USB data communication with the first USB controller 51 through the DP and DM signals. When the first USB interface 11 is configured as DCP, according to the USB BC Protocol, the discharging mode selection module 15 connects a resistance of less than 200 ohms between the DP and DM, and disconnects the DP and DM from the pull-down resistor to ground. The first USB interface 11 has a VBUS supply voltage of 5 V. After detecting the DCP mode, the charged device 21 can be charged rapidly from the VBUS of the first USB interface 11 at a maximum of 1.5 A, but USB data communication cannot be performed between the USB controller 51 and the charged device 21 at this time. The USB BC Protocol also defines a CDP mode, in which the USB interface can perform USB data communication or can be used for fast charging at a power exceeding 5 V and 500 mA. However, CDP model is not widely supported in practical applications due to its poor compatibility.

The discharging mode selection module 15 may also configure the first USB interface 11 according to other fast charging protocols to complete the configuration of the mode. For example, Apple Fast Charging Protocol defines multiple fast charging modes of 5 V and 1 A, 5 V and 2.1 A, and 5 V and 2.4 A.

According to Apple Fast Charging Protocol, when the first USB interface 11 is configured in a 5 V and 1 A fast charging mode, DP is connected with a 75 k resistor to VBUS and a 49.9 K resistor to ground; and DM is connected with a 43.2 K resistor to VBUS and a 49.9 K resistor to ground. When the first USB interface 11 is configured in a 5 V and 2.1 A fast charging mode, DP is connected with a 43.2 K resistor to VBUS and a 49.9 K resistor to ground; and DM is connected with a 75 K resistor to VBUS and a 49.9 K resistor to ground. When the first USB interface 11 is configured in 5 V and 2.4 A fast charging mode, DP is connected with a 43.2 K resistor to VBUS and a 49.9 K resistor to ground; and DM is connected with a 43.2 K resistor to VBUS and a 49.9 K resistor to ground.

The discharging mode selection module 15 may use the SDP defined by the USB BC Protocol as the charging and communication mode, use the 5 V and 1 A, 5 V and 2.1 A, and 5 V and 2.4 A fast charging modes defined by Apple Fast Charging Protocol as the single charging mode, and configure the DP and DM signals according to the requirements of the protocol.

Furthermore, the Qualcomm Quick Charge 2.0 and Quick Charge 3.0 Protocols define a fast charging mode that allows the charged device to be charged with a power exceeding 5 V and 500 mA. Qualcomm Quick Charge 2.0 and Quick Charge 3.0 Protocols define communication protocols on DP and DM to complete the configuration of the fast charging modes. Their communication protocols require that the voltages of DP and DM dynamically change according to the timing required by the protocol.

The discharging mode selection module 15 may use the SDP defined by the USB BC Protocol as the charging and communication mode and use the fast charging mode defined by the Qualcomm Quick Charge 2.0 and Quick Charge 3.0 Protocols as the single charging mode. When the first USB interface 11 is configured in the single charging mode, the discharging mode selection module 15 configures the DP and DM signals according to the requirements of the Qualcomm Quick Charge 2.0 and Quick Charge 3.0 Protocols, that is, communicates with the charged device 21 through the DP and DM signals according to the protocol requirements, and dynamically configures the voltage and timing of the DP and DM signals according to the protocol requirements.

When the first USB interface 11 is a USB type C receptacle, it further includes CC1 and CC2 signals. The USB Power Delivery charging protocol defines its fast charging protocol through state and data communication on the CC1 and CC2. When the first USB interface 11 is a USB type C receptacle, the discharging mode selection module 15 may select the mode defined by the USB Power Delivery charging protocol as the single charging mode or the charging and communication mode, and complete the configuration of the mode through the CC1 and CC2 signals. When the first USB interface 11 is a USB type C receptacle, the discharging mode selection module 15 may also select to complete the configuration of the mode by the DP and DM signals as described above.

The discharging mode selection module 15 may also configure the first USB interface 11 according to other fast charging protocols, which will not be listed here one by one.

In this embodiment, the charged device 21 may be a mobile device running the Android system and having a USB Micro B or USB Micro AB receptacle, or a mobile device running the Android system and having a USB type C receptacle.

When the first USB interface 11 is a USB type A receptacle and the charged device 21 has a USB Micro B or a USB Micro AB receptacle, two ends of the first USB cable 31 are provided with a USB type A plug and a USB micro B plug, respectively.

When the first USB interface 11 is a USB type A receptacle and the charged device 21 has a USB type C receptacle, the two ends of the first USB cable 31 are provided with a USB type A plug and a USB type C plug, respectively.

When the first USB interface 11 is a USB type C receptacle and the charged device 21 has a USB micro B or USB micro AB receptacle, the two ends of the first USB cable 31 are provided with a USB type C plug and a USB micro B plug, respectively.

When the first USB interface 11 is a USB type C receptacle and the charged device 21 has a USB type C receptacle, the two ends of the first USB cable 31 are provided with a USB type C plug and a USB type C plug, respectively.

The micro-control unit 5 further includes a second USB controller 52, The second USB interface 12 is connected with the second USB controller 52 of the micro-control unit 5. The second USB controller 52 operates in the USB Device mode. When the second USB interface 12 is connected with the PC host 22 through the second USB cable 32, the micro-control unit 5 may selectively perform USB data communication with the PC host 22 through the second USB controller 52, or perform USB data communication with the charged device 21 through the first USB controller 51 in the charging and communication mode.

Figure 2:
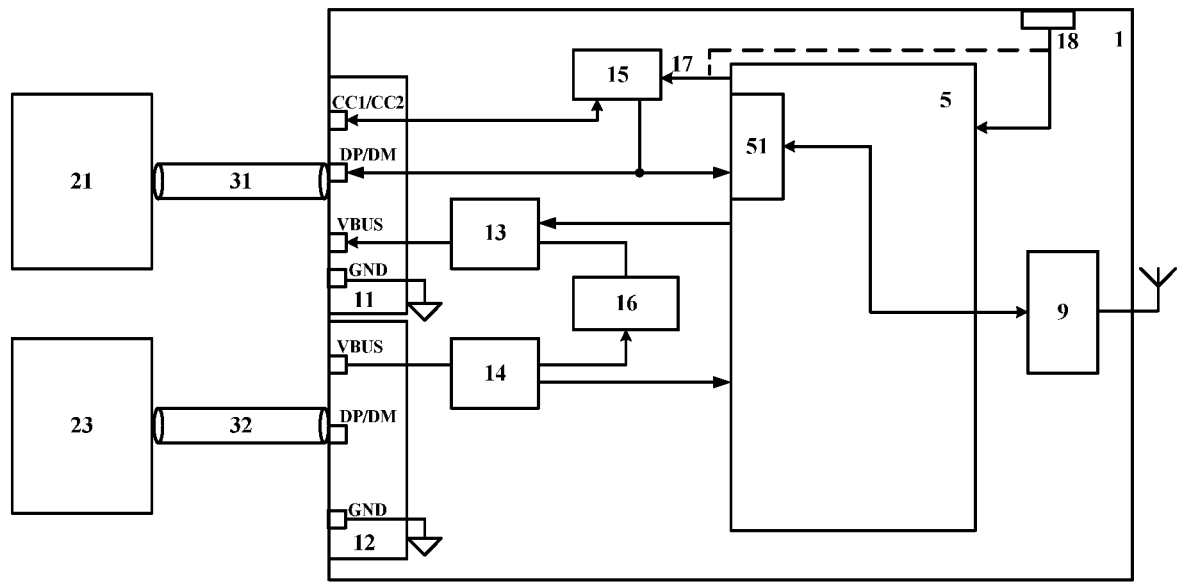
FIG. 2 is a block view and schematic illustration of application of a second embodiment of the intelligent mobile power supply capable of USB data communication according to the present invention.

FIG. 2 shows a second embodiment of an intelligent mobile power supply capable of USB data communication according to the present invention.

This embodiment differs from the embodiment shown in FIG. 1 in that the intelligent mobile power supply 1 includes a wireless transmitting and receiving apparatus 9 with which the micro-control unit 5 is connected. In the charging and communication mode, the micro-control unit 5 performs USB data communication with the charged device 21 through the first USB controller 51 and transmits and receives data through the wireless transmitting and receiving apparatus 9.

A method for USB data communication with the intelligent mobile power supply according to the present invention will be described below with reference to the first and second embodiments. In this method, the intelligent mobile power supply 1 includes a first USB interface 11 and a second USB interface 12. The first USB interface 11 is connected with a USB interface of a charged device 21 through a first USB cable 31. The second USB interface 12 may be connected with a PC host 22 through a second USB cable 32 to charge the intelligent mobile power supply 1, and the charged device 21 runs the Android operating system.

The discharging mode selection module 15 of the intelligent mobile power supply 1 selectively configures the first USB interface 11 into a single charging mode or a charging and communication mode according to a discharging mode selection signal 17, and completes the configuration of the mode according to a fast charging protocol.

In the single charging mode, the charged device 21 receives the discharge of the intelligent mobile power supply 1 through a VBUS, but the intelligent mobile power supply 1 does not perform USB data communication with the charged device 21.

In the charging and communication mode, the charged device 21 receives the discharge of the intelligent mobile power supply 1 through the VBUS, and may perform USB data communication with the intelligent mobile power supply 1 through DP and DM simultaneously.

DP and DM signals of the first USB controller 51 of the intelligent mobile power supply 1 are connected with the first USB interface 11 to perform USB data communication with the charged device 21 in the charging and communication mode.

When the first USB interface 11 is not connected with the charged device 21, the discharging mode selection module 15 of the intelligent mobile power supply 1 sets the first USB interface 11 to the single charging mode.

When the USB interface of the charged device 21 is connected with the first USB interface through the first USB cable 31, the first USB interface 11 remains in the single charging mode.

In the single charging mode, a user can artificially force the intelligent mobile power supply 1 to change the configuration of the first USB interface 11 to the charging and communication mode, and can notify the change of the mode of the charged device 21 by cutting off the VBUS power supply and reconnecting the VBUS power supply. The micro-control unit 5 of the intelligent mobile power supply 1 generates a control signal to the discharging control module 13, which is used by the micro-control unit 5 to control whether the discharging control module 13 is disconnected or connected with the VBUS power supply of the first USB interface 11.

The VBUS powering off and re-powering can be used by the charging device 21 to trigger the detection of the mode of the first USB interface 11. The charged device 21 may also periodically detect the mode of the first USB interface 11. The charged device 21 detects the mode of the first USB interface 11 according to the fast charging protocol. When the charged device 21 detects that the first USB interface 11 has changed to the charging and communication mode, the charged device 21 initiates the USB data connection with the intelligent mobile power supply 1 while being charged and performs USB data communication with the intelligent mobile power supply 1.

After the USB data connection between the charged device and the intelligent mobile power supply is established, the first USB controller 51 may notify the charged device 21 to start a designated APP through the USB data connection and conduct subsequent USB data communication with it. The first USB controller 51 may notify the charged device 21 to start the designated APP through, but not limited to, the Android Open Accessory Protocol (AOA Protocol) and perform subsequent USB data communication therewith through the AOA Protocol.

In the charging and communication mode, the first USB controller 51 operates in a USB Host mode, and the charged device 21 operates in the USB Device mode.

The Android Open Accessory Protocol (AOA Protocol) is a protocol for USB communication between Android devices and peripheral devices introduced by Google Inc. The protocol extends the functions of the USB interface of Android devices and provides conditions for the application of intelligent devices based on Android system in the fields of data transmission and device control.

The APP mentioned can read from and write to the storage device 7 of the first embodiment or transmit and receive data through the wireless transmitting and receiving apparatus 9 of the second embodiment in the charging and communication mode. The storage device 7 of the first embodiment may be a flash memory card, a flash memory chip, or a hard disk.

In this method, the micro-control unit 5 of the intelligent mobile power supply 1 generates a discharging mode selection signal 17. A dotted line between a switch or button 18 and the discharging mode selection signal 17 is invalid. The switch or button 18 is an input signal of the micro-control unit 5. The micro-control unit 5 generates the discharging mode selection signal 17 according to the state of the switch or button 18, according to USB data communication with the charged device 21, or according to the internal state of the micro-control unit 5.

When the APP stops reading from and writing to the storage device 7 of the first embodiment in the charging and communication mode or stops transmitting and receiving data through the wireless transmitting and receiving apparatus 9 of the second embodiment and a preset time is exceeded, the micro-control unit 5 of the intelligent mobile power supply 1 drives the discharging mode selection signal 17 to switch the first USB interface 11 to the single charging mode through the discharging mode selection module 15. Alternatively, the micro-control unit 5 may notify the switching of the mode of the charged device 21 by controlling the discharging control module 13 to disconnect and reconnect the VBUS power supply of the first USB interface 11 through the control signal to the discharging control module 13.

The charging control module 14 of the intelligent mobile power supply 1 generates a control signal to the micro-control unit 5 for the latter to acquire the power and state information of the battery 16 through the charging control module 14. In the charging and communication mode, the first USB controller 51 in the micro-control unit 5 can transmit the power and state information of the battery to said APP through USB data communication.

When said APP is closed in the charging and communication mode, a notification can be sent to the intelligent mobile power supply 1 through USB data communication before said APP stops running. After receiving the notification, the first USB controller 51 in the micro-control unit 5 drives the discharging mode selection signal 17 to switch the first USB interface 11 to the single charging mode through the discharging mode selection module 15. Alternatively, the micro-control unit 5 may notify the switching of the mode of the charged device 21 by controlling the discharging control module 13 to disconnect and reconnect the VBUS power supply of the first USB interface 11 through the control signal to the discharging control module 13.

When said APP attempts USB data communication with the intelligent mobile power supply 1, but the first USB interface 11 of the intelligent mobile power supply 1 is in the single charging mode, said APP may inform the user that the intelligent mobile power supply 1 may be artificially forced to change the configuration of the first USB interface 11 to the charging and communication mode. Said APP may notify the user by displaying a prompt message on the charged device 21.

In this method, the method for artificially forcing the intelligent mobile power supply 1 to change the configuration of the first USB interface 11 to the charging and communication mode may be, but is not limited to, artificially toggling or pressing the switch or button 18 included in the intelligent mobile power supply 1. The micro-control unit 5 in the intelligent mobile power supply 1 drives the discharging mode selection signal 17 after detecting this operation, and changes the configuration of the first USB interface 11 to the charging and communication mode through the discharging mode selection module 15.

The intelligent mobile power supply and method for USB data communication therewith of the present invention allow switching between the single charging mode and the charging and communication mode to ensure that the mobile device can perform data communication with the mobile power supply and can also rapidly charge the mobile device when there is no data communication, by fully utilizing the USB interface capable of supplying power and performing data communication simultaneously, thus resulting in expanded functions of the mobile power supply and an enhanced user experience.

The above is merely a description of preferred embodiments of the present invention and is not intended to limit the present invention in any way. The protection scope of the present invention should be based on what is stated in the claims. All simple changes, equivalent substitutions or decomposition and combination of the above specific embodiments according to the technical essence of the present invention fall within the protection scope of the technical scheme of the present invention.

What is claimed is:

1. An intelligent mobile power supply, comprising a battery, a charging control module, a discharging control module, a first USB interface and a second USB interface, and characterized in that:
    the intelligent mobile power supply further comprises a micro-control unit, a discharging mode selection module and a discharging mode selection signal,
    the first USB interface is connected with a USB interface of a charged device through a first USB cable,
    a VBUS signal of the first USB interface is connected with the discharging control module which is connected with the battery,
    DP and DM signals, or CC1 and CC2 signals, or DP and DM and CC1 and CC2 signals of the first USB interface are connected with the discharging mode selection module,
    the discharging mode selection module is connected with the discharging mode selection signal, selectively configures the first USB interface into a single charging mode or a charging and communication mode according to the discharging mode selection signal, and completes the configuration of the mode according to a fast charging protocol,
    in the single charging mode, the charged device receives a discharge of the intelligent mobile power supply through a VBUS, but the intelligent mobile power supply does not perform USB data communication with the charged device,
    in the charging and communication mode, the charged device receives the discharge of the intelligent mobile power supply through the VBUS and may perform USB data communication with the intelligent mobile power supply simultaneously,
    the micro-control unit comprises a first USB controller, wherein the DP and DM signals of the first USB interface are connected with the first USB controller; the first USB controller works in a USB Host mode and performs USB data communication with the charged device in the charging and communication mode,
    the second USB interface is connected with the charging control module which is connected with the battery, and the second USB interface is connected with a power adapter or a PC host to charge the battery through a second USB cable.

2. The intelligent mobile power supply according to claim 1, characterized in that:
    the intelligent mobile power supply further comprises a storage device, and the micro-control unit further comprises a storage controller, wherein the storage controller is connected with the storage device; in the charging and communication mode, the micro-control unit performs USB data communication with the charged device through the first USB controller and performs read and write operation on the storage device through the storage controller simultaneously.

3. The intelligent mobile power supply according to claim 2, characterized in that:
    the storage device is a flash memory card, a flash memory chip or a hard disk.

4. The intelligent mobile power supply according to claim 1, characterized in that:
    the intelligent mobile power supply further comprises a wireless transmitting and receiving apparatus, the micro-control unit is connected with the wireless transmitting and receiving apparatus, and in the charging and communication mode, the micro-control unit performs USB data communication with the charged device through the first USB controller and transmits and receives data through the wireless transmitting and receiving apparatus.

5. The intelligent mobile power supply according to claim 1, characterized in that:
    the charging control module is also connected with the micro-control unit which obtains power and state information of the battery through the charging control module.

6. The intelligent mobile power supply according to claim 1, characterized in that:
    the discharging mode selection signal is generated by a switch or button included in the intelligent mobile power supply or by the micro-control unit.

7. The intelligent mobile power supply according to claim 1, characterized in that:
    the fast charging protocol is USB Battery Charging Protocol, Qualcomm Quick Charging protocol, Huawei Fast Charger Protocol, Samsung Adaptive Fast Charging Protocol, Mediatek Pump Express Charging Protocol, Apple Fast Charging Protocol or USB Power Delivery Charging Protocol.

8. The intelligent mobile power supply according to claim 1, characterized in that:
    the charging and communication mode is Standard Download Port (SDP) defined by the USB Battery Charging Protocol.

9. The intelligent mobile power supply according to claim 1, characterized in that:
    the charging and communication mode is a Charging Download Port (CDP) defined by the USB Battery Charging Protocol.

10. The intelligent mobile power supply according to claim 1, characterized in that:
    the single charging mode is a mode defined by a fast charging protocol other than the Standard Download Port (SDP) and the Charging Download Port (CDP) defined by the USB Battery Charging Protocol.

11. The intelligent mobile power supply according to claim 1, characterized in that:
the micro-control unit further comprises a second USB controller, the second USB interface is connected with the second USB controller of the micro-control unit, and the second USB controller works in a USB Device mode, and
when the second USB interface is connected with the PC host through the second USB cable, the micro-control unit may selectively perform USB data communication with the PC host through the second USB controller or perform USB data communication with the charged device through the first USB controller in the charging and communication mode.

12. The intelligent mobile power supply according to claim 1, characterized in that:
the charged device is a mobile device running an Android system.

13. A method for USB data communication with an intelligent mobile power supply, the intelligent mobile power supply comprising a first USB interface, the first USB interface being connected with a USB interface of a charged device through a first USB cable, and characterized in that:
the intelligent mobile power supply further comprises a first USB controller,
the intelligent mobile power supply selectively configures the first USB interface into a single charging mode or a charging and communication mode, and completes the configuration of the mode according to a fast charging protocol,
in the single charging mode, the charged device receives a discharge of the intelligent mobile power supply through a VBUS, but the intelligent mobile power supply does not perform USB data communication with the charged device,
in the charging and communication mode, the charged device receives the discharge of the intelligent mobile power supply through the VBUS and may perform USB data communication with the intelligent mobile power supply simultaneously,
the first USB controller is connected with the first USB interface and performs USB data communication with the charged device in the charging and communication mode,
when the first USB interface is not connected with the charged device, the intelligent mobile power supply sets the first USB interface to the single charging mode,
when the USB interface of the charged device is connected with the first USB interface through the first USB cable, the first USB interface remains in the single charging mode,
in the single charging mode, a user may artificially force the intelligent mobile power supply to change the configuration of the first USB interface to the charging and communication mode, and when the charged device detects that the first USB interface has changed to the charging and communication mode, the charged device starts the USB data connection with the intelligent mobile power supply and performs USB data communication while being charged, and
in the charging and communication mode, the first USB controller works in a USB Host mode and the charged device works in a USB Device mode.

14. The method for USB data communication with the intelligent mobile power supply according to claim 13, characterized in that:
after the USB data connection between the charged device and the intelligent mobile power supply is established, the first USB controller notifies the charged device to start a designated APP through the USB data connection and performs subsequent USB data communication with the charged device.

15. The method for USB data communication with the intelligent mobile power supply according to claim 14, characterized in that:
the intelligent mobile power supply further comprises a storage device, and the APP performs USB data interaction with the intelligent mobile power supply in the charging and communication mode to read from and write to the storage device.

16. The method for USB data communication with the intelligent mobile power supply according to claim 15, characterized in that:
the storage device is a flash memory card, a flash memory chip or a hard disk.

17. The method for USB data communication with the intelligent mobile power supply according to claim 14, characterized in that:
the intelligent mobile power supply further comprises a wireless transmitting and receiving apparatus, and the APP performs USB data interaction with the intelligent mobile power supply in the charging and communication mode and transmits and receives data through the wireless transmitting and receiving apparatus.

18. The method for USB data communication with the intelligent mobile power supply according to claim 13, characterized in that:
the method for artificially forcing the intelligent mobile power supply to change the configuration of the first USB interface to the charging and communication mode is to artificially toggle or press the switch or button included in the intelligent mobile power supply, and the intelligent mobile power supply changes the configuration of the first USB interface to the charging and communication mode after detecting this operation.

19. The method for USB data communication with the intelligent mobile power supply according to claim 13, characterized in that:
the fast charging protocol is USB Battery Charging protocol, Qualcomm Quick Charging protocol, Huawei Fast Charger protocol, Samsung Adaptive Fast Charging Protocol, Mediatek Pump Express Charging Protocol, Apple Fast Charging Protocol or USB Power Delivery Charging Protocol.

20. The method for USB data communication with the intelligent mobile power supply according to claim 13, characterized in that:
the charging and communication mode is Standard Download Port (SDP) defined by the USB Battery Charging Protocol.

21. The method for USB data communication with the intelligent mobile power supply according to claim 13, characterized in that:
the charging and communication mode is a Charging Download Port (CDP) defined by the USB Battery Charging Protocol.

22. The method for USB data communication with the intelligent mobile power supply according to claim 13, characterized in that:
the single charging mode is a mode defined by a fast charging protocol other than the Standard Download Port (SDP) and the Charging Download Port (CDP) defined by the USB Battery Charging Protocol.

23. The method for USB data communication with the intelligent mobile power supply according to claim 13, characterized in that:
the charged device is a mobile device running an Android system.

24. The method for USB data communication with the intelligent mobile power supply according to claim 13, characterized in that:
the intelligent mobile power supply further comprises a second USB interface which may be connected with a power adapter or a PC host through a second USB cable to charge the intelligent mobile power supply.

25. The method for USB data communication with the intelligent mobile power supply according to claim 24, characterized in that:
the intelligent mobile power supply further comprises a second USB controller, the second USB interface is connected with the second USB controller, and the second USB controller works in the USB Device mode, and when the second USB interface is connected with the PC host through the second USB cable, the intelligent mobile power supply may selectively perform USB data communication with the PC host through the second USB controller or perform USB data communication with the charged device through the first USB controller in the charging and communication mode.

* * * * *